(12) United States Patent
Nguyen et al.

(10) Patent No.: US 8,705,619 B2
(45) Date of Patent: Apr. 22, 2014

(54) DIRECTIONAL DISCRETE WAVELET TRANSFORM (DDWT) FOR VIDEO COMPRESSION APPLICATIONS

(75) Inventors: Thai-Ha Nguyen, San Jose, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 346 days.

(21) Appl. No.: 12/962,645

(22) Filed: Dec. 7, 2010

(65) Prior Publication Data

US 2011/0249724 A1  Oct. 13, 2011

Related U.S. Application Data

(60) Provisional application No. 61/322,721, filed on Apr. 9, 2010.

(51) Int. Cl.
*H04N 7/30* (2006.01)
(52) U.S. Cl.
USPC ..................................... 375/240.03
(58) Field of Classification Search
USPC ................. 375/240.16, 240.18; 382/240, 248
IPC ....................................................... H04N 11/04
See application file for complete search history.

(56) References Cited

U.S. PATENT DOCUMENTS

| | | | |
|---|---|---|---|
| 6,539,412 B1 | 3/2003 | Kim et al. | |
| 6,628,716 B1 | 9/2003 | Tan et al. | |
| 7,336,720 B2 | 2/2008 | Martemyanov et al. | |
| 7,620,103 B2 | 11/2009 | Cote et al. | |
| 2006/0008164 A1* | 1/2006 | Wu et al. | 382/240 |
| 2008/0008246 A1* | 1/2008 | Mukherjee et al. | 375/240.18 |
| 2008/0304562 A1 | 12/2008 | Chang et al. | |
| 2008/0310512 A1* | 12/2008 | Ye et al. | 375/240.16 |
| 2009/0041365 A1* | 2/2009 | Meany | 382/248 |

FOREIGN PATENT DOCUMENTS

WO  2009110673 A1  9/2009

OTHER PUBLICATIONS

Nguyen et al.—"QP Adaptive Coefficients Scanning and Application"—utility U.S. Appl. No. 13/078,779, filed Apr. 1, 2011, pp. 1-28.
Dragotti, P. et al.—"Discrete directional wavelet bases and frames for image compression and denoising"—Proc. vol. 5150, Visual Communications and Image Processing, 2003, pp. 1287-1295.

* cited by examiner

*Primary Examiner* — Jay Patel
*Assistant Examiner* — Neil Mikeska
(74) *Attorney, Agent, or Firm* — John P. O'Banion

(57) ABSTRACT

An apparatus and method for encoding video using directional discrete waveform transforms (DDWT), such as within a codec device. DDWT can be utilized to replace the use of intra transforms and inter transforms within the encoding system. In many ways the output of the DDWT can be compared with that provided using MDDT, however, it does not require a training process while it also provides enhanced encoding of feature edges with desirable visual characteristics. The transforms are applied in at least two passes, along the prediction direction, and then across the prediction direction, instead of being applied in fixed vertical and horizontal directions. Directional scaling is not required prior to the second stage of transforms.

20 Claims, 11 Drawing Sheets mode 4, stage 2 mode 4, stage 1 mode 4, stage 1 mode 5, stage 2 mode 5, stage 1 mode 5, stage 1 mode 4, stage 2 mode 4, stage 1 mode 4, stage 1 mode 5, stage 2 mode 5, stage 1 mode 5, stage 1

DIRECTIONAL DISCRETE WAVELET TRANSFORM (DDWT) FOR VIDEO COMPRESSION APPLICATIONS

CROSS-REFERENCE TO RELATED APPLICATIONS

This application claims priority from U.S. provisional application Ser. No. 61/322,721 filed on Apr. 9, 2010, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to video compression encoding, and more particularly to inter and intra coding using directional discrete wavelet transforms (DDWT).

2. Description of Related Art

Advanced video coding can utilize both spatial and temporal predictions to increase coding gain. Intra compression coding utilizes spatial prediction, exploiting spatial redundancy, in which each sample in an n×n block is predicted from the neighboring constructed reference samples. The resulting picture is referred to as an I-picture. Traditionally, I-pictures are encoded by directly applying the transform to all macroblocks in the picture, which generates a larger number of data bits compared to that of inter coding performed between the frames of a video sequence. In creating an I-picture, a "difference" or residual image is generated in response to subtracting the intra frame predicted image from the original input image. In many systems a Discrete Cosine Transform (DCT) transform is applied to this residual image with the resulting coefficients being adaptively quantized and coded into a bit stream. Increased compression is provided as the amount of data required for the residual image is reduced when using an accurate intra prediction. Intra frame prediction differs from inter frame prediction as it is utilized within a single frame.

Inter compression coding has many similarities with the above, however, it utilizes temporal prediction exploiting temporal redundancy, in which each sample in an n×n block is predicted from pixels in neighboring pictures/frames. The resulting picture is referred to as a P-picture (predicted), or B-picture (Backward-prediction) depending on the prediction direction.

The use of mode-dependent directional transforms (MDDT) provide some improvement over Advanced Video Coding (AVC) for intra coding, but these benefits are significantly reduced in response to application on a full Group Of Pictures (GOP). For example, the use of MDDT on class C (e.g., 832×480 pixels) and class D (e.g., 416×240 pixels) sequences results in less than 2% average bitrate reduction as measured by the average percentage Bjontegaard (BD) rate changes as specified in ITU-T SG16/Q6 Doc. VCEG-A111, while in I-frames the improvement is only (7-8%) average BD-Rate reduction. MDDT is not used for inter prediction errors, which also contain direction information, because the inclusion of explicit detection and transmission of edge direction information would introduce significant overhead and reduce overall performance. In addition, MDDT is complex (e.g., hardware and/or software) and does not provide high visual quality.

Current techniques of intra and inter coding adversely impact visual quality of reconstructed images, in particular near feature edges.

Accordingly, a need exists for a system and method of performing inter and intra coding with improved accuracy and reduced feature distortion. These needs and others are met within the present invention, which overcomes the deficiencies of previously developed transform coding systems and methods.

BRIEF SUMMARY OF THE INVENTION

The present invention teaches an apparatus and method of performing Directional Discrete Wavelet Transforms (DDWT) which can be utilized in video compression applications which rely on the use of wavelet transforms. It will be appreciated that codecs making use of wavelet transforms (e.g., Haar wavelet) are just now entering the market at the time of this writing, particularly associated with camera workflows and RAW image formatting in motion sequences.

One object of the present invention is to replace the intra transforms in AVC and the KTA (Key Technology Area Software developed by the ITU-T Video Coding Experts Group) with improved techniques. Encoders configured for DDWT provide output which is comparable to Mode-Dependent Directional Transforms (MDDT) in terms of Peak Signal-to-Noise Ratios (PSNR), while providing a more accurate appearance nearby image feature edges (or simply "edges") within the scenes. It should be appreciated that MDDT obtains its high PSNR in response to its training, in which a training set comprising a large set of video sequences are utilized to derive the transform matrices which are thus trained in response to these video sequences. The present DDWT system and method does not require training with a training set. In smooth regions the DDWT performs as well as MDDT or DCT approaches, while it preserves more visual quality around edges. The DDWT system and method is fixed (does not require training) and is less complex than MDDT, whereby DDWT is implemented more readily with less overhead and is less prone to failure.

The DDWT technique includes use of differently sized transforms (e.g., 4×4, 8×8, 16×16) configured for application on intra and/or inter prediction errors. It will be appreciated that transforms of different shapes or sizes, in particular larger transforms, can be derived from the teachings herein.

One of the objects of the present invention is that of creating a set of new transforms for use with DDWT which can be applied in the coding of intra frames, such as within H.264 or similar video compression technologies. It is desirable to make the transform coefficients sparse so that they can be easily coded for subsequent storage and/or transmission sent to the decoder. It is also important that the reconstructed image have desirable visual characteristics containing a minimal number of visual artifacts.

In existing encoding approaches the transform is applied horizontally and vertically in a fixed pattern, whereby it is applied across edges which negatively impact the visual quality of the reconstructed images.

The present invention overcomes shortcomings of existing systems and can be used with both intra coding and inter coding. The direction of the feature is taken into account as wavelet transforms are first applied along the feature edge and then across the feature edge. This results in an improved coding which retains more of the original feature characteristics.

For intra coding, the transform is applied along and then across the prediction direction instead of horizontally and vertically. At each component transform, a discrete wavelet transform is used. For inter coding, since the inter prediction is not directional, the transform is applied vertically and then horizontally. The transforms are applied to the same set of coefficients.

The Haar wavelet is utilized in each component transform, and provides certain advantages over the DDCT transforms. The DDWT approach is simple (i.e., easily implemented and of low complexity) while it enhances visual quality in response to preserving feature edges. The use of different (e.g., directional) scaling coefficients, such as used in the DDCT approach, are not required in the coding stages, in particular the second stage, except for low pass coefficients.

In DDWT, a transform is performed on low pass coefficients in the second stage, which is partially compatible with the Haar transform, (i.e., use of 2-tap filters and decimation by two). The filter coefficients are modified in DDWT to take into account any scaling coefficients and to enforce orthonormal properties with no-DC bias.

DDWT transforms according to the invention provide increased efficiency and yield better visual quality in response to their application across the edges, and the use of wavelet transforms which are more compact than DCTs.

Numerous tests have been performed on the DDWT encoding apparatus and method according to the invention and comparisons made with MDDT and DDCT approaches. For example test sequences were performed on both class C (e.g., 832×480 pixels) and class D (e.g., 416×240 pixels) video. The test conditions included two cases of I-only and full GOP. In the I-only case, 40 frames were used for class D, and 30 frames used for class C. These tests were performed on the beginning of the sequences. In the Full GOP case, a hierarchical B was used.

DDWT compared favorably with MDDT, having similar performance in the full GOP case providing improved edge preservation and thus a more pleasing visual output. Application of DDWT to images with strong and clean edges provided more visual improvement than obtained for sequences having more textures. The I-frames generated with DDWT provide a better base than MDDT, upon which to create P and B frames. Accordingly, in the case of full GOP case DDWT provided similar PSNR as the trained MDDT, while retaining more high frequency information within DDWT I-frames which improves the coding accuracy of P-frames and B-frames. In the implementation tested, DDWT lost a measure of its competitive benefits when applied to large sequences, such as class A and class B. Efficiency of the current implementation of DDWT was limited in view of the tests being performed on 16×16 blocks in modes 0 and 1.

The DDWT approach described herein is amenable to implementation of numerous variations without departing from the teachings of the present invention. By way of example and not limitation, one variation describes using more bits to code pixels at the block boundaries, which should increase the efficiency of predicting subsequent blocks. It will be appreciated that this is made possible because of the spatial localization properties of wavelets. The variation can be implemented by scaling the transform coefficients around the block boundaries, effectively using a smaller quantization step size for these coefficients.

Additional variations may be beneficially implemented, such as incorporating entropy encoding, run-length encoding, and/or tree structures, and by improving the wavelet transforms, such as the use of other appropriate wavelets (e.g., biorthogonal wavelets such as 5-3 wavelets) and/or mixing wavelet and DCT transforms.

The invention is amenable to being embodied in a number of ways, including but not limited to the following descriptions.

One embodiment of the invention is an apparatus for inter and intra coding of video within a video encoder, comprising: (a) a computer (e.g., one or more processing elements, or combination of processing element(s) and acceleration hardware) having an associated memory and configured for video encoding; and (b) programming (e.g., firmware and/or software) configured for retention on the associated memory (e.g., one or more memories which can be accessed by the computer) and executable on the computer for, (b)(i) predicting blocks within video frames based on previously-coded spatial or temporal information (e.g., previously coded blocks in the same frame, or blocks from a previously coded frame), (b)(ii) generating a residual image (i.e., difference between original image block and predicted image block), (b)(iii) applying wavelet transforms as Directional Discrete Wavelet Transforms (DDWT) to the residual images in response to prediction directions of current blocks to generate blocks of coefficients, wherein the DDWT is applied in multiple stages comprising a first stage along a prediction direction, and at least a second stage across the prediction direction, (b)(iv) quantizing the blocks of coefficients into quantized coefficients, and (b)(v) scanning and coding of the quantized coefficients into an encoded video output. The wavelet transforms are not applied in the apparatus in fixed horizontal and vertical directions during intra coding which would cross feature edges and negatively impact quality of reconstructed images. Directional Discrete Wavelet Transforms (DDWT) according to the invention, provide a new set of wavelet transforms for coding of residual images.

In at least one implementation of the invention, the second stage comprises a plurality of transforms which may be of different sizes. The wavelet transforms can comprise Haar wavelet transforms, or other similar wave-based transforms, such as 5-3 wavelets, other biorthogonal wavelets, and/or a mixture of wavelet and DCT transforms. When using a Haar transform, it is preferred that it include 2-tap filters with decimation by two. In at least one implementation of the invention, the Directional Discrete Wavelet Transforms (DDWT) are configured for utilizing nine (9) transforms for a 4×4 block, nine (9) transforms for a 8×8 block, and four (4) transforms for a 16×16 block. In at least one implementation of the invention different sizes of transforms are used in DDWT for application on different intra and/or inter prediction errors. For example, the Directional Discrete Wavelet Transforms (DDWT) preferably comprise sizes 4×4, 8×8 and 16×16.

In at least one implementation of the invention, the apparatus provides improved visual appearance near image feature edges, even though DDWT relies on the use of fixed encoding without the use of training with a training set. Accordingly, the present invention need not incorporate the training and training sets required by many approaches, such as MDDT. In at least one implementation of the invention, DDWT provides encoding of video output with a similar Peak Signal-to-Noise Ratio (PSNR) value as obtained with Mode-Dependent Directional Transforms (MDDT), while improving visual appearance of the video output around image feature edges. In at least one implementation of the invention, the amount of high frequency energy retained in Directional Discrete Wavelet Transforms (DDWT) I-frames when performing DDWT intra coding exceeds that provided in response to Mode-dependent directional transform (MDDT) encoding. In at least one implementation of the invention, the programming further comprises coding of additional pixels at block boundaries to increase prediction efficiency of subsequent blocks. In at least one implementation of the invention, the processing of scanning and coding comprises performing a fixed scanning pattern based on the Quantization Parameter (QP) and the intra prediction mode. In at least one implementation of the invention, the apparatus incorporates entropy encoding, run-length encoding, tree structures, and or other mechanisms to reduce the bit rate for a given quality of compressed video.

One embodiment of the invention is an apparatus for inter and intra coding of video within a video encoder, comprising: (a) a computer (e.g., one or more processing elements, or combination of processing elements and acceleration hardware) having an associated memory (e.g., one or more memories which can be accessed by the computer) and configured for video encoding; and (b) programming (e.g., firmware and/or software) configured for retention on the associated memory and executable on the computer for, (b)(i) predicting blocks within video frames (or slices) based on previously-coded spatial or temporal information, (b)(ii) generating residual images, (b)(iii) applying wavelet transforms as Directional Discrete Wavelet Transforms (DDWT) to the residual images (i.e., prediction error) in response to prediction directions of current blocks to generate blocks of coefficients, wherein the DDWT creates a new set of wavelet transforms for coding residual images, and applies the transforms in multiple stages comprising a first stage along a prediction direction, and at least a second stage across the prediction direction which utilize a plurality of transforms which may be of different sizes, (b)(iv) quantizing the blocks of coefficients into quantized coefficients, and (b)(v) scanning and coding of the quantized coefficients using a fixed scanning pattern such as based on the QP and the prediction mode into an encoded video output.

One embodiment of the invention is a method of coding video within a video encoder, comprising: (a) predicting blocks within video frames based on previously-coded spatial or temporal information; (b) generating a residual image; (c) applying wavelet transforms as Directional Discrete Wavelet Transforms (DDWT) to the residual images in response to prediction directions of current blocks to generate blocks of coefficients; wherein the DDWT is applied in multiple stages comprising a first stage along a prediction direction, and at least a second stage across the prediction direction; (d) quantizing the blocks of coefficients into quantized coefficients; and (e) scanning and coding of the quantized coefficients into an encoded video output.

The present invention provides a number of beneficial elements which can be implemented either separately or in any desired combination without departing from the present teachings.

An element of the invention is a video coding apparatus and method for use within video/image compression to improve visual quality.

Another element of the invention is a coding mechanism that utilizes wavelet transforms which do not require directional scaling during intermediate transform stages.

Another element of the invention is a wavelet coding mechanism that can be utilized for both inter prediction errors and intra prediction errors.

Another element of the invention is a coding mechanism that can be utilized in a wide range of applications, including but not limited to: cameras, digital SLRs, handycams, televisions, automotive, video disks (e.g., Blu-Ray®), on-line video distribution, video gaming systems, and other applications which can benefit from increased video coding efficiency.

Another element of the invention is an coding mechanism that can be utilized within advanced video coding techniques, such as H.264, H.265, AVC and other existing and upcoming compression standards.

Another element of the invention is a directional transform mechanism providing a set of transforms to apply to the prediction errors within the video compression framework.

Another element of the invention is a coding mechanism that does not apply transforms in fixed directions (e.g., horizontal and then vertical direction) which may be directly across feature edges, but instead performs the first transform along the feature edge.

Another element of the invention is a directional wavelet transform coding mechanism that applies wavelet transforms in different sizes in at least two stages along and across the prediction direction.

Another element of the invention is a directional wavelet transform mechanism that can be applied using floating point or integer arithmetic.

Another element of the invention is a directional transform mechanism that does not require training with training sets in order to reach high Peak Signal to Noise Ratios (PSNR).

Another element of the invention is a directional wavelet coding mechanism that is performed in at least one embodiment in response to a fixed scanning order, instead of the traditional zigzag scanning order.

Another element of the invention is a directional wavelet coding mechanism that uses adaptive scanning, such as adaptation performed in response to Quantization Parameter (QP) and prediction mode.

Another element of the invention is a wavelet coding mechanism that can provide similar levels of performance as Mode Dependent Directional Transforms (MDDT) with less complexity and overhead.

Another element of the invention is a directional wavelet transform coding mechanism that in at least one embodiment utilizes Context-Adaptive Variable Length Coding (CAVLC), Context-Adaptive Binary Arithmetic Coding (CABAC), or other context adaptive coding methods.

Another element of the invention is a directional wavelet transform coding mechanism with at least one first stage of wavelet transforms which is performed along the prediction direction, followed by at least one stage of wavelet transforms performed across the prediction direction.

Another element of the invention is a directional wavelet transform coding mechanism having a first stage performed along the prediction direction, and a second stage performed across the prediction direction.

Another element of the invention is an adaptive wavelet coding mechanism which assigns a different transform and scanning pattern to each prediction mode (e.g., direction).

Another element of the invention is an adaptive directional wavelet coding mechanism with a complexity level similar to that of separable transforms, such as AVC.

Another element of the invention is an adaptive wavelet coding transform mechanism implemented as matrix operators.

Another element of the invention is an adaptive directional wavelet coding mechanism which does not require that directional scaling be performed through the combination of transform stages.

A still further element of the invention is a method and apparatus for increasing the efficiency of intra and inter prediction during video coding.

Further element of the invention will be brought out in the following portions of the specification, wherein the detailed description is for the purpose of fully disclosing preferred embodiments of the invention without placing limitations thereon.

BRIEF DESCRIPTION OF THE SEVERAL
VIEWS OF THE DRAWING(S)

The invention will be more fully understood by reference to the following drawings which are for illustrative purposes only:

DETAILED DESCRIPTION OF THE INVENTION 1.0 Introduction to the DDWT Transform

A transform is described for use in video compression applications. The technique can be utilized with different sized blocks and associated transforms, such as those using 4×4, 8×8, 16×16 coefficient transforms applied on intra/inter prediction errors. It should be appreciated that larger size transforms can also be derived based on the teachings herein.

1.1 DDWT and its Relation to DDCT

The Directional Discrete Wavelet Transform (DDWT) shares a number of similarities with the Directional Discrete Cosine Transform (DDCT), and is designed to improve visual quality by choosing basis functions that have compact spatial supports.

Intra coding in AVC and the Role of DDWT.

Intra coding predicts the image content based on the value of previously decoded pixels in the same frame (or slice). It will be remembered that intra prediction is based on a spatial prediction, while inter prediction is based on temporal prediction between frames. Intra coding provides a number of predictions, such as according to at least one embodiment having nine (9) prediction modes for 4×4 blocks, nine (9) prediction modes for 8×8 blocks, and four (4) prediction modes for 16×16 blocks. For each intra prediction mode, an intra prediction algorithm is used to predict the image content in the current block based on decoded neighbors. The intra prediction errors (residual images) are then processed by a transform to produce coefficients. The transform coefficients are then quantized, scanned into a one-dimensional (1D) signal, and entropy coded using CAVLC or CABAC.

Figures 1, 2:
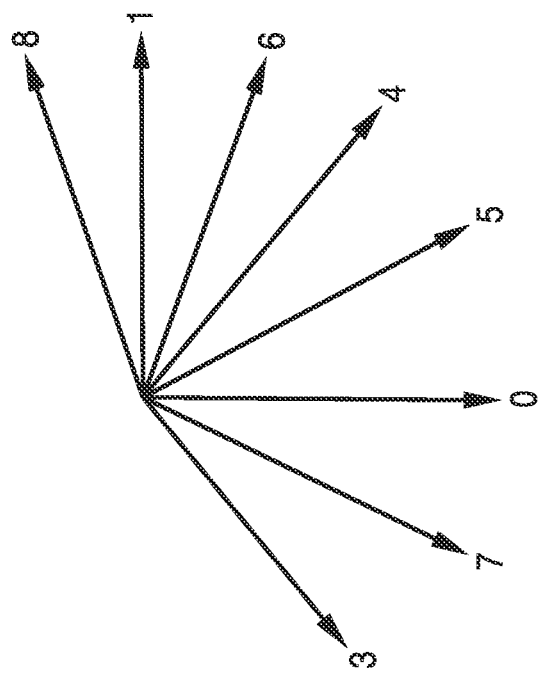
FIG. 1 is a pixel block showing pixels to be predicted in response to neighboring values as utilized according to elements of the present invention.
FIG. 2 is a graph of prediction directions for use in intra coding performed according to elements of the present invention.

FIG. 1 depicts a block of pixels marked a to p which are to be predicted, while pixels A to I exemplify neighboring pixels which are available at the time of prediction. For a prediction mode of 0, pixels a, e, i, and m are predicted based on the neighboring pixel A. Similarly, pixels b, f, j and n are predicted based on pixel B, and so forth.

FIG. 2 depicts intra prediction directions for a 4×4 luma block. It should be appreciated that one of the directional modes is that of DC mode, mode 2, which is not shown in FIG. 1B because it is not a direction. It will be appreciated that the phrase prediction mode is generally used herein to describe prediction directions which include that of DC mode, which per-se does not have a direction.

In this embodiment framework, DDWT replaces AVC transforms by a set of transforms that take into account the prediction mode of the current block. Hence, DDWT provides nine (9) transforms for 4×4, nine (9) transforms for 8×8, and four (4) transforms for 16×16, although many of them are the same or can be simply inferred from a core transform. For each transform, the DDWT also provides a fixed scanning pattern in response to QP and the intra prediction mode to replace the zigzag scanning pattern of DCT coefficients, such as used in AVC.

Figure 3:
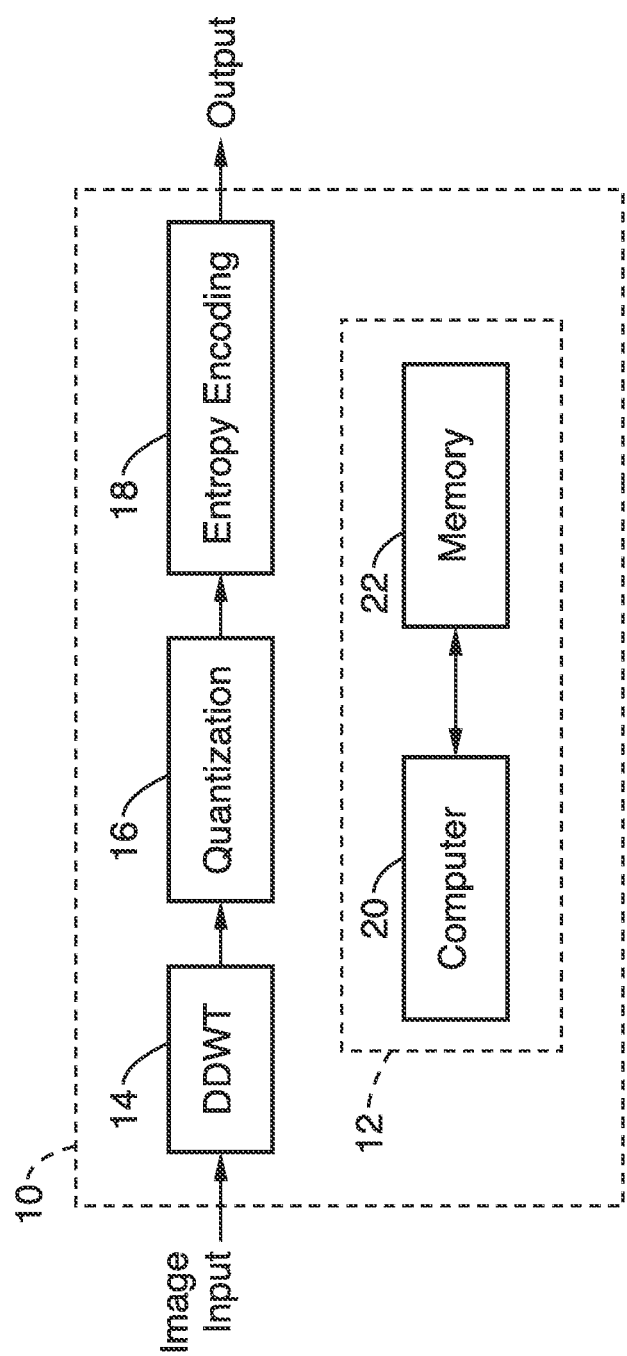
FIG. 3 is block diagram of a DDWT video encoder configured according to an embodiment of the present invention.

FIG. 3 illustrates an example embodiment 10 of the invention in which an image input is received and processed 14 according the Directional Discrete Wavelet Transforms (DDWT) described herein, prior to quantization 16 and entropy coding 18 to generate an encoded video output. It will be appreciated that steps 14, 16 and 18 are preferably performed by at least one processing element 12, exemplified as a computer 20 and associated memory 22.

1.3. DDWT Transforms

FIG. 4A through FIG. 7C illustrate that DDWT transforms are two-stage transforms, with the first stage conducted along the prediction direction and the second stage applied across the prediction direction. It is seen in these example embodiments that the DDWT transforms provide nine (9) transforms for 4×4, nine (9) transforms for 8×8, and four (4) transforms for 16×16. For each intra prediction mode, the DDWT transform consists of two stages.

Stage 1 is performed along the prediction direction. Pixels that align along the prediction direction are grouped together and feed into an intermediate transform in the second stage, such as derived from the Haar wavelet. It should be noted that in cases of prediction modes that are neither horizontal nor vertical, the intermediate transforms used are of different sizes.

Stage 2 is performed across the prediction direction. Another stage of intermediate transforms is applied to the transform coefficients generated from the first stage transforms. Again, the intermediate transforms may be of different sizes.

Once the transforms are applied to the prediction errors, a fixed scanning pattern based on the QP and the intra prediction mode is used to order the transform coefficients into a 1D signal (1D array), similar to the role of zigzag scanning of DCT coefficients in AVC.

Figure 4C:
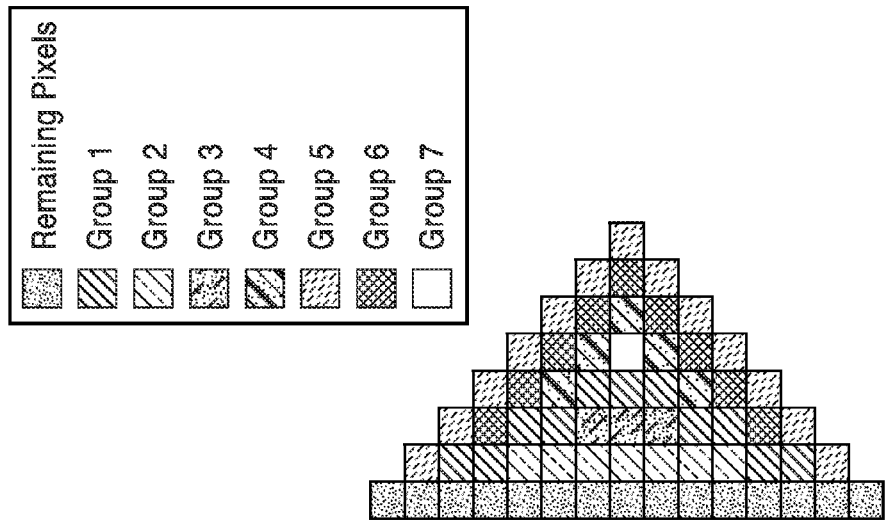
FIG. 4A through FIG. 4C is a process diagram of DDWT for 8×8 intra prediction in mode 4 (diagonal down right) according to an aspect of the present invention.
Figure 4B:
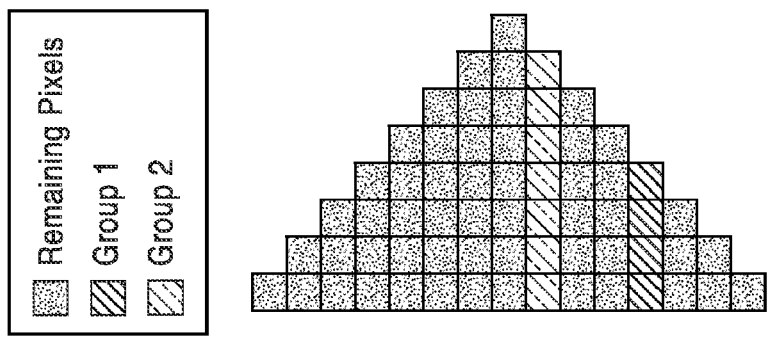
Figure 4A:
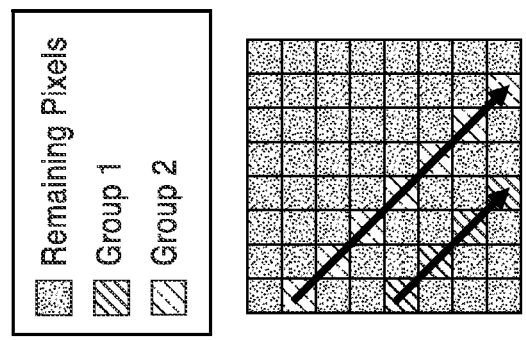

FIG. 4A through FIG. 4C illustrate an example embodiment of DDWT for 8×8 intra prediction mode 4 (diagonal down right). In FIG. 4A and FIG. 4B is shown the first stage, while FIG. 4C depicts the second stage. Each intermediate transform is exemplified as being derived from the Haar wavelet transform, and may be of different sizes. At the first stage, pixels along the same directional lines are processed through the same one dimensional DWT. For example, the pixels with the dark diagonal-hatch pattern (Group 1) are transformed by a four point DWT, the pixels marked with the dashed diagonal-hatch pattern (Group 2) are transformed by a seven point DWT. The remaining pixels after these transformations are marked with a speckled pattern (Remaining). After the pixels are transformed by various size one dimensional DWT, the transformed coefficients are rearranged as shown in FIG. 4B depicting the same groups of pixels. At the second stage, the transformed pixels from the first stage with similar frequency attributes from FIG. 4B are grouped together as depicted by the patterns shown in FIG. 4C. Then the transformed coefficients with the same hatch pattern (Group 1 through Group 7) in FIG. 4C are processed through another one dimensional DWT.

Figure 5C:
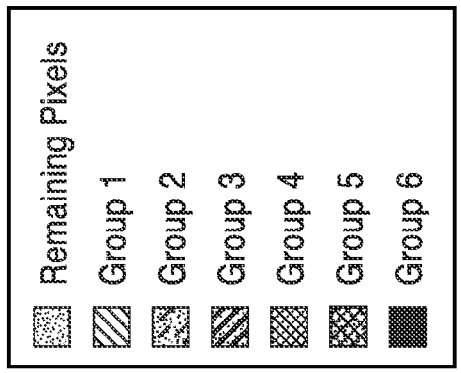
FIG. 5A through FIG. 5C is a process diagram of DDWT for 8×8 intra prediction in mode 5 (diagonal down down right) according to an aspect of the present invention.
Figure 5C:
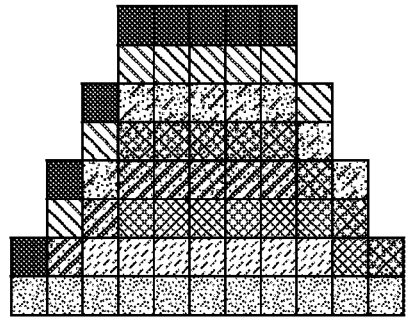
Figure 5B:
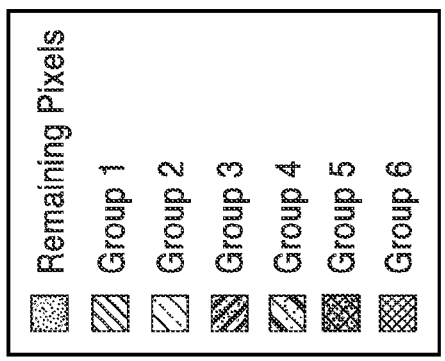
Figure 5B:
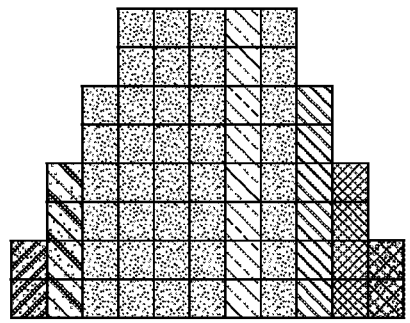
Figure 5A:
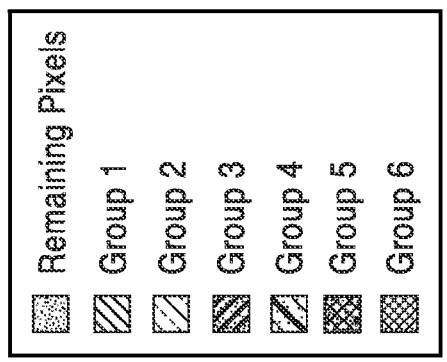
Figure 5A:
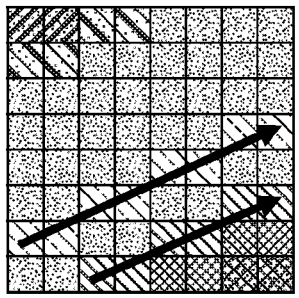

FIG. 5A through FIG. 5C illustrates an example embodiment of DDWT for 8×8 intra prediction mode 5 (down down right). In FIG. 5A and FIG. 5B is shown the first stage, with FIG. 5C depicting the second stage, each showing 6 pixel groups and the remaining pixels in a group (Group 1 through Group 6 and Remaining pixels). Each intermediate transform is derived from the Haar wavelet transform, and may be of different sizes. At the second stage, pixels of the same cross-hatch pattern go through the same intermediate transform.

Figure 6C:
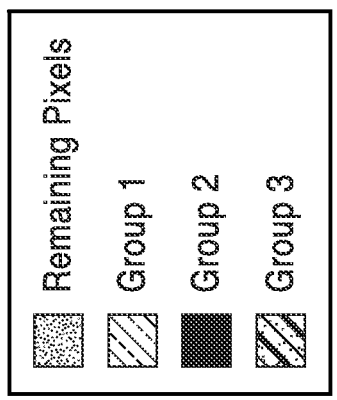
FIG. 6A through FIG. 6C is a process diagram of DDWT for 4×4 intra prediction in mode 4 (diagonal down right) according to an aspect of the present invention.
Figure 6C:
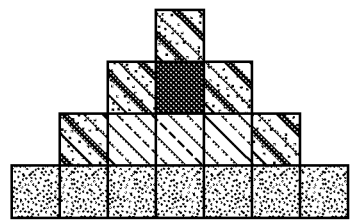
Figure 6B:
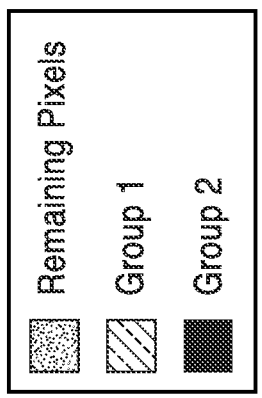
Figure 6B:
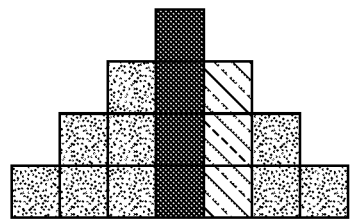
Figure 6A:
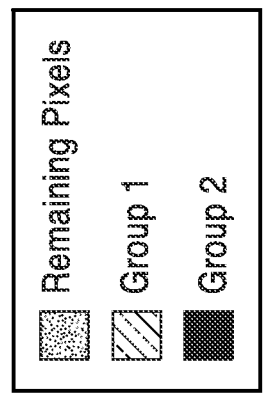
Figure 6A:
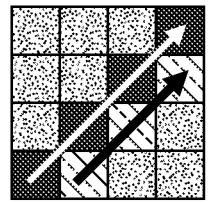

FIG. 6A through FIG. 6C illustrates an example embodiment of DDWT for 4×4 intra prediction mode 4 (down right). In FIG. 6A and FIG. 6B is shown the first stage, with pixel Group 1 and pixel Group 2 and Remaining pixels, with FIG. 6C illustrating the second stage showing pixel Group 1, Group 2 and Group 3 as well as the Remaining pixels. Each intermediate transform is derived from the Haar wavelet transform, and may be of different sizes. At the second stage, pixels depicted in the figures with the same cross-hatch pattern are processed through the same intermediate transforms.

Figure 7C:
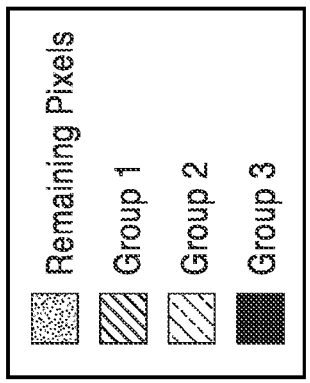
FIG. 7A through FIG. 7C is a process diagram of DDWT for 4×4 intra prediction in mode 4 (diagonal down down right) according to an aspect of the present invention.
Figure 7C:
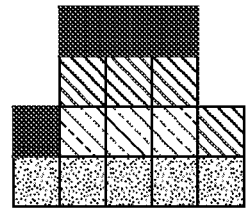
Figure 7B:
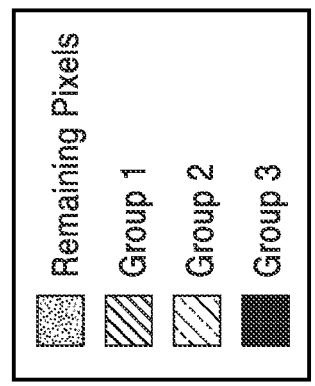
Figure 7B:
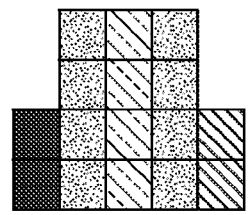
Figure 7A:
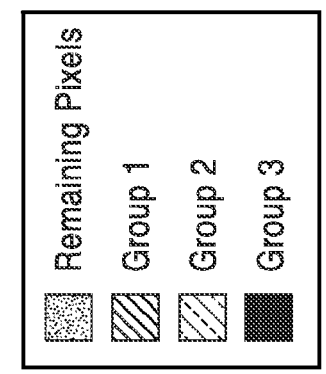
Figure 7A:
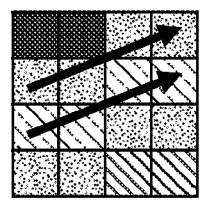

FIG. 7A through FIG. 7C illustrates an example embodiment of DDWT for 4×4 intra prediction mode 5 (down down right). In FIG. 7A and FIG. 7B is shown the first stage, with pixel Group 1, pixel Group 2, pixel Group 3 and Remaining pixels. In FIG. 7C is depicted a second stage showing the same pixel groups as in FIG. 7A and FIG. 7B. Each intermediate transform in this embodiment is derived from the Haar wavelet transform, and may be of different sizes. At the second stage, pixels depicted in the figure with the same cross-hatch pattern are processed through the same intermediate transform.

1.4. Properties of DDWT.

The DDWT possesses the following properties: localization, adaptability, directionality, symmetry, and complexity (to the order of separable transforms).

Localization is provided by DDWT, because the basis vectors of the intermediate transforms have compact spatial support. Accordingly, the effect of quantization tends not to spread out around the edges, which helps to preserve the visual quality of the reconstructed images.

Adaptability is provided by DDWT, in contrast to AVC, in which the same DCT-like transform is applied at the intra prediction errors for all intra prediction modes of the same block size (e.g., 4×4, 8×8, or 16×16). DDWT, however, assigns a different transform and scanning pattern to each intra prediction mode. These transforms and scanning patterns are configured in response to the intra prediction direction.

Directionality is provided by the DDWT, since the intra prediction mode is known. The DDWT transform is designed with the knowledge of the intra prediction direction. By first applying the transform along the prediction direction, DDWT has the potential to minimize the artifacts around the boundaries between features.

Symmetry is beneficially provided by DDWT. Although there are 22 DDWT transforms for 22 intra prediction modes in the example embodiment described (e.g., nine (9) modes for 4×4, nine (9) modes for 8×8, and four (4) modes for 16×16), these transforms can be derived, using simple operators such as rotation and/or reflection, from only seven (7) different core transforms, outlined below.

16×16: one transform for all 16×16 modes.
8×8 and 4×4:
Modes 0, 1: same transform;
Modes 3 and 4: the DDWT transform for mode 4 can be obtained from the transform for mode 3 using a reflection on the vertical line at the center of the block;
Modes 5 to 8: the DDWT transforms for mode 6-8 can be derived from that of mode 3 using reflection and/or rotation.

Complexity of DDWT is similar to other separable transforms. Similar to the traditional transforms of AVC, DDWT transforms are also two-stage transforms. Hence, the complexity of DDWT is similar to other separable transforms. Furthermore, since DDWT transforms are made up from a series of wavelet transforms (e.g., Haar wavelet transforms), they are amenable to simplification toward reduced complexity.

2. DDWT Implementation

2.1. Matrix Implementation of Intermediate Transforms

For simplicity of implementation, the intermediate transforms in DDWT are implemented as matrix operators whose matrix entries are quantized to seven (7) bit precision. For future work, fast implementation and integer arithmetic can be used to replace the current implementation to obtain better performance as well as smaller dynamic range.

The transform matrices $W_N$ for the intermediate transform of size N and its inverse $W_N^{-1}$ are given as follows.

$$W_1 = W_1^{-1} = 128$$

$$W_2 = \begin{bmatrix} 91 & 91 \\ 91 & -91 \end{bmatrix}$$

$$W_2^{-1} = \begin{bmatrix} 90 & 90 \\ 90 & -90 \end{bmatrix}^T$$

$$W_3 = \begin{bmatrix} 74 & 74 & 74 \\ -104 & 52 & 52 \\ 0 & -91 & 91 \end{bmatrix}$$

$$W_3^{-1} = \begin{bmatrix} 74 & 74 & 74 \\ -104 & 52 & 52 \\ 0 & -90 & 90 \end{bmatrix}^T$$

$$W_4 = \begin{bmatrix} 64 & 64 & 64 & 64 \\ 64 & 64 & -64 & -64 \\ 91 & -91 & 0 & 0 \\ 0 & 0 & 91 & -91 \end{bmatrix}$$

$$W_4^{-1} = \begin{bmatrix} 64 & 64 & 64 & 64 \\ 64 & 64 & -64 & -64 \\ 90 & -90 & 0 & 0 \\ 0 & 0 & 90 & -90 \end{bmatrix}^T$$

$$W_5 = \begin{bmatrix} 57 & 57 & 57 & 57 & 57 \\ -47 & -47 & -47 & 70 & 70 \\ -104 & 52 & 52 & 0 & 0 \\ 0 & -91 & 91 & 0 & 0 \\ 0 & 0 & 0 & -91 & 91 \end{bmatrix}$$

$$W_5^{-1} = \begin{bmatrix} 57 & 57 & 57 & 57 & 57 \\ -47 & -47 & -47 & 70 & 70 \\ -104 & 52 & 52 & 0 & 0 \\ 0 & -90 & 90 & 0 & 0 \\ 0 & 0 & 0 & -90 & 90 \end{bmatrix}^T$$

$$W_6 = \begin{bmatrix} 52 & 52 & 52 & 52 & 52 & 52 \\ -74 & -74 & 37 & 37 & 37 & 37 \\ 0 & 0 & -64 & -64 & 64 & 64 \\ -91 & 91 & 0 & 0 & 0 & 0 \\ 0 & 0 & -91 & 91 & 0 & 0 \\ 0 & 0 & 0 & 0 & -91 & 91 \end{bmatrix}$$

$$W_6^{-1} = \begin{bmatrix} 52 & 52 & 52 & 52 & 52 & 52 \\ -74 & -74 & 37 & 37 & 37 & 37 \\ 0 & 0 & -64 & -64 & 64 & 64 \\ -90 & 90 & 0 & 0 & 0 & 0 \\ 0 & 0 & -90 & 90 & 0 & 0 \\ 0 & 0 & 0 & 0 & -90 & 90 \end{bmatrix}^T$$

$$W_7 = \begin{bmatrix} 48 & 48 & 48 & 48 & 48 & 48 & 48 \\ -56 & -56 & -56 & 42 & 42 & 42 & 42 \\ -104 & 52 & 52 & 0 & 0 & 0 & 0 \\ 0 & 0 & 0 & 64 & 64 & -64 & -64 \\ 0 & -91 & 91 & 0 & 0 & 0 & 0 \\ 0 & 0 & 0 & -91 & 91 & 0 & 0 \\ 0 & 0 & 0 & 0 & 0 & -91 & 91 \end{bmatrix}$$

$$W_7^{-1} = \begin{bmatrix} 48 & 48 & 48 & 48 & 48 & 48 & 48 \\ -56 & -56 & -56 & 42 & 42 & 42 & 42 \\ -104 & 52 & 52 & 0 & 0 & 0 & 0 \\ 0 & 0 & 0 & 64 & 64 & -64 & -64 \\ 0 & -90 & 90 & 0 & 0 & 0 & 0 \\ 0 & 0 & 0 & -90 & 90 & 0 & 0 \\ 0 & 0 & 0 & 0 & 0 & -90 & 90 \end{bmatrix}^T$$

$$W_8 = \begin{bmatrix} 46 & 46 & 46 & 46 & 45 & 45 & 45 & 45 \\ -45 & -45 & -45 & -45 & 45 & 45 & 45 & 45 \\ 64 & 64 & -64 & -64 & 0 & 0 & 0 & 0 \\ 0 & 0 & 0 & 0 & 64 & 64 & -64 & -64 \\ -91 & 91 & 0 & 0 & 0 & 0 & 0 & 0 \\ 0 & 0 & -91 & 91 & 0 & 0 & 0 & 0 \\ 0 & 0 & 0 & 0 & -91 & 91 & 0 & 0 \\ 0 & 0 & 0 & 0 & 0 & 0 & -91 & 91 \end{bmatrix}$$

$$W_8^{-1} = \begin{bmatrix} 45 & 45 & 45 & 45 & 45 & 45 & 45 & 45 \\ -45 & -45 & -45 & -45 & 46 & 46 & 46 & 46 \\ 64 & 64 & -64 & -64 & 0 & 0 & 0 & 0 \\ 0 & 0 & 0 & 0 & 64 & 64 & -64 & -64 \\ -90 & 90 & 0 & 0 & 0 & 0 & 0 & 0 \\ 0 & 0 & -90 & 90 & 0 & 0 & 0 & 0 \\ 0 & 0 & 0 & 0 & -90 & 90 & 0 & 0 \\ 0 & 0 & 0 & 0 & 0 & 0 & -90 & 90 \end{bmatrix}^T$$

$$W_9 = \begin{bmatrix} 43 & 43 & 43 & 43 & 43 & 43 & 43 & 43 & 43 \\ -38 & -38 & -38 & -38 & -38 & 48 & 48 & 48 & 48 \\ -47 & -47 & -47 & 70 & 70 & 0 & 0 & 0 & 0 \\ -104 & 52 & 52 & 0 & 0 & 0 & 0 & 0 & 0 \\ 0 & 0 & 0 & 0 & 0 & 64 & 64 & -64 & -64 \\ 0 & -91 & 91 & 0 & 0 & 0 & 0 & 0 & 0 \\ 0 & 0 & 0 & -91 & 91 & 0 & 0 & 0 & 0 \\ 0 & 0 & 0 & 0 & 0 & -91 & 91 & 0 & 0 \\ 0 & 0 & 0 & 0 & 0 & 0 & 0 & -91 & 91 \end{bmatrix}$$

$$W_9^{-1} = \begin{bmatrix} 42 & 42 & 42 & 43 & 43 & 42 & 42 & 42 & 42 \\ -38 & -38 & -38 & -38 & -38 & 48 & 48 & 48 & 48 \\ -47 & -47 & -47 & 70 & 70 & 0 & 0 & 0 & 0 \\ -104 & 52 & 52 & 0 & 0 & 0 & 0 & 0 & 0 \\ 0 & 0 & 0 & 0 & 0 & 64 & 64 & -64 & -64 \\ 0 & -90 & 90 & 0 & 0 & 0 & 0 & 0 & 0 \\ 0 & 0 & 0 & -90 & 90 & 0 & 0 & 0 & 0 \\ 0 & 0 & 0 & 0 & 0 & -90 & 90 & 0 & 0 \\ 0 & 0 & 0 & 0 & 0 & 0 & 0 & -90 & 90 \end{bmatrix}^T$$

-continued $$W_{11} = \begin{bmatrix} 38 & 38 & 38 & 38 & 39 & 39 & 39 & 39 & 39 & 39 & 39 \\ -51 & -51 & -51 & -51 & 29 & 29 & 29 & 29 & 29 & 29 & 29 \\ 0 & 0 & 0 & 0 & -42 & -42 & -42 & -42 & 56 & 56 & 56 \\ -64 & -64 & -64 & -64 & 0 & 0 & 0 & 0 & 0 & 0 & 0 \\ 0 & 0 & 0 & 0 & 64 & 64 & -64 & -64 & 0 & 0 & 0 \\ 0 & 0 & 0 & 0 & 0 & 0 & 0 & 0 & -52 & -52 & 104 \\ -91 & 91 & 0 & 0 & 0 & 0 & 0 & 0 & 0 & 0 & 0 \\ 0 & 0 & -91 & 91 & 0 & 0 & 0 & 0 & 0 & 0 & 0 \\ 0 & 0 & 0 & 0 & -91 & 91 & 0 & 0 & 0 & 0 & 0 \\ 0 & 0 & 0 & 0 & 0 & 0 & -91 & 91 & 0 & 0 & 0 \\ 0 & 0 & 0 & 0 & 0 & 0 & 0 & 0 & -91 & 91 & 0 \end{bmatrix}$$

$$W_{11}^{-1} = \begin{bmatrix} 38 & 38 & 38 & 38 & 39 & 39 & 39 & 39 & 39 & 39 & 39 \\ -51 & -51 & -51 & -51 & 29 & 29 & 29 & 29 & 29 & 29 & 29 \\ 0 & 0 & 0 & 0 & -42 & -42 & -42 & -42 & 56 & 56 & 56 \\ -64 & -64 & -64 & -64 & 0 & 0 & 0 & 0 & 0 & 0 & 0 \\ 0 & 0 & 0 & 0 & 64 & 64 & -64 & -64 & 0 & 0 & 0 \\ 0 & 0 & 0 & 0 & 0 & 0 & 0 & 0 & -52 & -52 & 104 \\ -90 & 90 & 0 & 0 & 0 & 0 & 0 & 0 & 0 & 0 & 0 \\ 0 & 0 & -90 & 90 & 0 & 0 & 0 & 0 & 0 & 0 & 0 \\ 0 & 0 & 0 & 0 & -90 & 90 & 0 & 0 & 0 & 0 & 0 \\ 0 & 0 & 0 & 0 & 0 & 0 & -90 & 90 & 0 & 0 & 0 \\ 0 & 0 & 0 & 0 & 0 & 0 & 0 & 0 & -90 & 90 & 0 \end{bmatrix}^T$$

$$W_{13} = \begin{bmatrix} 36 & 36 & 36 & 36 & 36 & 36 & 36 & 36 & 36 & 36 & 36 & 36 & 36 \\ -28 & -28 & -28 & -28 & -28 & -28 & -28 & -28 & 45 & 45 & 45 & 45 & 45 \\ -45 & -45 & -45 & -45 & 45 & 45 & 45 & 45 & 0 & 0 & 0 & 0 & 0 \\ 0 & 0 & 0 & 0 & 0 & 0 & 0 & 0 & -70 & -70 & 47 & 47 & 47 \\ 64 & 64 & -64 & -64 & 0 & 0 & 0 & 0 & 0 & 0 & 0 & 0 & 0 \\ 0 & 0 & 0 & 0 & 64 & 64 & -64 & -64 & 0 & 0 & 0 & 0 & 0 \\ 0 & 0 & 0 & 0 & 0 & 0 & 0 & 0 & 0 & 0 & -52 & -52 & 104 \\ -91 & 91 & 0 & 0 & 0 & 0 & 0 & 0 & 0 & 0 & 0 & 0 & 0 \\ 0 & 0 & -91 & 91 & 0 & 0 & 0 & 0 & 0 & 0 & 0 & 0 & 0 \\ 0 & 0 & 0 & 0 & -91 & 91 & 0 & 0 & 0 & 0 & 0 & 0 & 0 \\ 0 & 0 & 0 & 0 & 0 & 0 & -91 & 91 & 0 & 0 & 0 & 0 & 0 \\ 0 & 0 & 0 & 0 & 0 & 0 & 0 & 0 & -91 & 91 & 0 & 0 & 0 \\ 0 & 0 & 0 & 0 & 0 & 0 & 0 & 0 & 0 & 0 & -91 & 91 & 0 \end{bmatrix}$$

$$W_{13}^{-1} = \begin{bmatrix} 36 & 36 & 36 & 36 & 36 & 36 & 36 & 36 & 36 & 36 & 36 & 36 & 36 \\ -28 & -28 & -28 & -28 & -28 & -28 & -28 & -28 & 45 & 45 & 45 & 45 & 45 \\ -46 & -46 & -46 & -46 & 46 & 46 & 46 & 46 & 0 & 0 & 0 & 0 & 0 \\ 0 & 0 & 0 & 0 & 0 & 0 & 0 & 0 & -70 & -70 & 47 & 47 & 47 \\ 64 & 64 & -64 & -64 & 0 & 0 & 0 & 0 & 0 & 0 & 0 & 0 & 0 \\ 0 & 0 & 0 & 0 & 64 & 64 & -64 & -64 & 0 & 0 & 0 & 0 & 0 \\ 0 & 0 & 0 & 0 & 0 & 0 & 0 & 0 & 0 & 0 & -52 & -52 & 104 \\ -90 & 90 & 0 & 0 & 0 & 0 & 0 & 0 & 0 & 0 & 0 & 0 & 0 \\ 0 & 0 & -90 & 90 & 0 & 0 & 0 & 0 & 0 & 0 & 0 & 0 & 0 \\ 0 & 0 & 0 & 0 & -90 & 90 & 0 & 0 & 0 & 0 & 0 & 0 & 0 \\ 0 & 0 & 0 & 0 & 0 & 0 & -90 & 90 & 0 & 0 & 0 & 0 & 0 \\ 0 & 0 & 0 & 0 & 0 & 0 & 0 & 0 & -90 & 90 & 0 & 0 & 0 \\ 0 & 0 & 0 & 0 & 0 & 0 & 0 & 0 & 0 & 0 & -90 & 90 & 0 \end{bmatrix}^T$$

$$W_{16} = \begin{bmatrix} 32 & 32 & 32 & 32 & 32 & 32 & 32 & 32 & 32 & 32 & 32 & 32 & 32 & 32 & 32 & 32 \\ -32 & -32 & -32 & -32 & -32 & -32 & -32 & -32 & 32 & 32 & 32 & 32 & 32 & 32 & 32 & 32 \\ -45 & -45 & -45 & -45 & 45 & 45 & 45 & 45 & 0 & 0 & 0 & 0 & 0 & 0 & 0 & 0 \\ 0 & 0 & 0 & 0 & 0 & 0 & 0 & 0 & -45 & -45 & -45 & -45 & -45 & -45 & -45 & -45 \\ -64 & -64 & 64 & 64 & 0 & 0 & 0 & 0 & 0 & 0 & 0 & 0 & 0 & 0 & 0 & 0 \\ 0 & 0 & 0 & 0 & -64 & -64 & 64 & 64 & 0 & 0 & 0 & 0 & 0 & 0 & 0 & 0 \\ 0 & 0 & 0 & 0 & 0 & 0 & 0 & 0 & -64 & -64 & 64 & 64 & 0 & 0 & 0 & 0 \\ 0 & 0 & 0 & 0 & 0 & 0 & 0 & 0 & 0 & 0 & 0 & 0 & -64 & -64 & 64 & 64 \\ -91 & 91 & 0 & 0 & 0 & 0 & 0 & 0 & 0 & 0 & 0 & 0 & 0 & 0 & 0 & 0 \\ 0 & 0 & -91 & 91 & 0 & 0 & 0 & 0 & 0 & 0 & 0 & 0 & 0 & 0 & 0 & 0 \\ 0 & 0 & 0 & 0 & -91 & 91 & 0 & 0 & 0 & 0 & 0 & 0 & 0 & 0 & 0 & 0 \\ 0 & 0 & 0 & 0 & 0 & 0 & -91 & 91 & 0 & 0 & 0 & 0 & 0 & 0 & 0 & 0 \\ 0 & 0 & 0 & 0 & 0 & 0 & 0 & 0 & -91 & 91 & 0 & 0 & 0 & 0 & 0 & 0 \\ 0 & 0 & 0 & 0 & 0 & 0 & 0 & 0 & 0 & 0 & -91 & 91 & 0 & 0 & 0 & 0 \\ 0 & 0 & 0 & 0 & 0 & 0 & 0 & 0 & 0 & 0 & 0 & 0 & -91 & 91 & 0 & 0 \\ 0 & 0 & 0 & 0 & 0 & 0 & 0 & 0 & 0 & 0 & 0 & 0 & 0 & 0 & -91 & 91 \end{bmatrix}$$

$$W_{16}^{-1} = \begin{bmatrix} 32 & 32 & 32 & 32 & 32 & 32 & 32 & 32 & 32 & 32 & 32 & 32 & 32 & 32 & 32 & 32 \\ -32 & -32 & -32 & -32 & -32 & -32 & -32 & -32 & 32 & 32 & 32 & 32 & 32 & 32 & 32 & 32 \\ -45 & -45 & -45 & -45 & 45 & 45 & 45 & 45 & 0 & 0 & 0 & 0 & 0 & 0 & 0 & 0 \\ 0 & 0 & 0 & 0 & 0 & 0 & 0 & 0 & -45 & -45 & -45 & -45 & -45 & -45 & -45 & -45 \\ -64 & -64 & 64 & 64 & 0 & 0 & 0 & 0 & 0 & 0 & 0 & 0 & 0 & 0 & 0 & 0 \\ 0 & 0 & 0 & 0 & -64 & -64 & 64 & 64 & 0 & 0 & 0 & 0 & 0 & 0 & 0 & 0 \\ 0 & 0 & 0 & 0 & 0 & 0 & 0 & 0 & -64 & -64 & 64 & 64 & 0 & 0 & 0 & 0 \\ 0 & 0 & 0 & 0 & 0 & 0 & 0 & 0 & 0 & 0 & 0 & 0 & -64 & -64 & 64 & 64 \\ -90 & 90 & 0 & 0 & 0 & 0 & 0 & 0 & 0 & 0 & 0 & 0 & 0 & 0 & 0 & 0 \\ 0 & 0 & -90 & 90 & 0 & 0 & 0 & 0 & 0 & 0 & 0 & 0 & 0 & 0 & 0 & 0 \\ 0 & 0 & 0 & 0 & -90 & 90 & 0 & 0 & 0 & 0 & 0 & 0 & 0 & 0 & 0 & 0 \\ 0 & 0 & 0 & 0 & 0 & 0 & -90 & 90 & 0 & 0 & 0 & 0 & 0 & 0 & 0 & 0 \\ 0 & 0 & 0 & 0 & 0 & 0 & 0 & 0 & -90 & 90 & 0 & 0 & 0 & 0 & 0 & 0 \\ 0 & 0 & 0 & 0 & 0 & 0 & 0 & 0 & 0 & 0 & -90 & 90 & 0 & 0 & 0 & 0 \\ 0 & 0 & 0 & 0 & 0 & 0 & 0 & 0 & 0 & 0 & 0 & 0 & -90 & 90 & 0 & 0 \\ 0 & 0 & 0 & 0 & 0 & 0 & 0 & 0 & 0 & 0 & 0 & 0 & 0 & 0 & -90 & 90 \end{bmatrix}^T$$

Transforms of the "DC" coefficients are compatible with DCT. It can be seen from the transform matrices that the first coefficients of the intermediate transform at the first stage can in fact be the exact same as the DC coefficients of the DCT. In the second stage, these coefficients need a special treatment other than using the intermediate transforms provided above. Below are the transform matrices when working with these "DC" coefficients at the second stage.

$$M_{15} = \begin{bmatrix} 16 & 23 & 28 & 32 & 36 & 39 & 42 & 45 & 42 & 39 & 36 & 32 & 28 & 23 & 16 \\ -14 & -20 & -24 & -28 & -32 & -35 & -37 & -40 & 48 & 44 & 41 & 36 & 31 & 26 & 18 \\ -34 & -49 & -60 & -69 & 30 & 32 & 35 & 37 & 0 & 0 & 0 & 0 & 0 & 0 & 0 \\ 0 & 0 & 0 & 0 & 0 & 0 & 0 & 0 & -33 & -31 & -28 & -25 & 80 & 66 & 46 \\ -62 & -87 & 46 & 53 & 0 & 0 & 0 & 0 & 0 & 0 & 0 & 0 & 0 & 0 & 0 \\ 0 & 0 & 0 & 0 & -66 & -72 & 57 & 61 & 0 & 0 & 0 & 0 & 0 & 0 & 0 \\ 0 & 0 & 0 & 0 & 0 & 0 & 0 & 0 & -60 & -56 & 73 & 66 & 0 & 0 & 0 \\ 0 & 0 & 0 & 0 & 0 & 0 & 0 & 0 & 0 & 0 & 0 & 0 & -40 & -33 & 117 \\ -105 & 74 & 0 & 0 & 0 & 0 & 0 & 0 & 0 & 0 & 0 & 0 & 0 & 0 & 0 \\ 0 & 0 & -97 & 84 & 0 & 0 & 0 & 0 & 0 & 0 & 0 & 0 & 0 & 0 & 0 \\ 0 & 0 & 0 & 0 & -95 & 86 & 0 & 0 & 0 & 0 & 0 & 0 & 0 & 0 & 0 \\ 0 & 0 & 0 & 0 & 0 & 0 & -93 & 87 & 0 & 0 & 0 & 0 & 0 & 0 & 0 \\ 0 & 0 & 0 & 0 & 0 & 0 & 0 & 0 & -87 & 94 & 0 & 0 & 0 & 0 & 0 \\ 0 & 0 & 0 & 0 & 0 & 0 & 0 & 0 & 0 & 0 & -85 & 94 & 0 & 0 & 0 \\ 0 & 0 & 0 & 0 & 0 & 0 & 0 & 0 & 0 & 0 & 0 & 0 & -81 & 99 & 0 \end{bmatrix}$$

$$M_{15}^{-1} = M_{15}^{T}$$

$$M_{11} = \begin{bmatrix} 23 & 32 & 39 & 45 & 45 & 45 & 45 & 45 & 39 & 32 & 23 \\ -26 & -36 & -44 & -51 & -51 & 40 & 40 & 40 & 35 & 28 & 20 \\ 0 & 0 & 0 & 0 & 0 & -67 & -67 & 54 & 47 & 38 & 27 \\ -40 & -56 & -68 & 59 & 59 & 0 & 0 & 0 & 0 & 0 & 0 \\ 0 & 0 & 0 & 0 & 0 & 0 & 0 & -99 & 57 & 47 & 33 \\ -52 & -74 & 91 & 0 & 0 & 0 & 0 & 0 & 0 & 0 & 0 \\ 0 & 0 & 0 & 0 & 0 & 0 & 0 & 0 & -91 & 74 & 52 \\ -105 & 74 & 0 & 0 & 0 & 0 & 0 & 0 & 0 & 0 & 0 \\ 0 & 0 & 0 & -91 & 91 & 0 & 0 & 0 & 0 & 0 & 0 \\ 0 & 0 & 0 & 0 & 0 & -91 & 91 & 0 & 0 & 0 & 0 \\ 0 & 0 & 0 & 0 & 0 & 0 & 0 & 0 & 0 & -74 & 105 \end{bmatrix}$$

$$M_{11}^{-1} = \begin{bmatrix} 23 & 32 & 39 & 45 & 45 & 45 & 45 & 45 & 39 & 32 & 23 \\ -26 & -36 & -44 & -51 & -51 & 40 & 40 & 40 & 35 & 28 & 20 \\ 0 & 0 & 0 & 0 & 0 & -68 & -68 & 54 & 47 & 38 & 27 \\ -40 & -56 & -68 & 59 & 59 & 0 & 0 & 0 & 0 & 0 & 0 \\ 0 & 0 & 0 & 0 & 0 & 0 & 0 & -99 & 57 & 47 & 33 \\ -52 & -74 & 91 & 0 & 0 & 0 & 0 & 0 & 0 & 0 & 0 \\ 0 & 0 & 0 & 0 & 0 & 0 & 0 & 0 & -91 & 74 & 52 \\ -104 & 74 & 0 & 0 & 0 & 0 & 0 & 0 & 0 & 0 & 0 \\ 0 & 0 & 0 & -90 & 90 & 0 & 0 & 0 & 0 & 0 & 0 \\ 0 & 0 & 0 & 0 & 0 & -90 & 90 & 0 & 0 & 0 & 0 \\ 0 & 0 & 0 & 0 & 0 & 0 & 0 & 0 & 0 & -74 & 104 \end{bmatrix}^{T}$$

The above transform matrices are obtained by scaling appropriate orthonormal matrices by $2^7=128$. Since the DDWT transforms are two-stage transforms, the transform coefficients are scaled by $2^{14}$ overall. Hence, it is necessary to scale back the transform coefficients. In the implementation of DDWT, this process is done by integrating the scaling factor $2^{14}$ into the quantization process.

2.2. Quantization.

The DDWT transforms are orthogonal whose basis functions all have the same norm $2^{14}$. Hence, this scaling factor is preferably compensated in the quantization process. Different tables for Q and R can be created for use, or by way of example and not limitation using the Q and R tables from MDDT.

The quantization formula can then be given by, $$Y_Q = [Y \cdot Q(QP\%6) + f_{enc}] >> (22 + QP/6)$$

where the pre-scaling factors can be given by, $$Q = [410\ 364\ 328\ 287\ 260\ 231],$$

and the offset number determined as $$f_{enc} = \frac{2^{22+QP/6}}{3}.$$

The de-quantization formula is then given by, $$Y = Y_Q \cdot R(QP\%6) << QP/6. \quad (1)$$

With the post-scaling factors being as follows, $$R = [40\ 45\ 50\ 57\ 63\ 71].$$

It should be appreciated that in reconstruction, since the inverse DDWT transforms are also scaled by 2^14, the reconstructed prediction errors $X_S$ also need to be compensated for the scaling factor, such as follows, $$X_S = (X + f_{dec}) >> 20 \quad (2)$$

in which $f_{dec} = 2^{19}$.

2.3. Special Implementation of Mode 2.

For simplicity of implementation, in 4×4 and 8×8 cases, the intra prediction mode 2 (the DC mode) uses the original implementation of AVC. The corresponding transforms for inter prediction with DDWT can be configured as DCT-like with integer arithmetic as desired. However, the transforms for mode 0 and 1, although they theoretically can be the same, they preferably use a matrix implementation instead of fast implementation as in mode 2. The performance of DDWT hence can be slightly improved by using the AVC implementation.

2.4. Complexity.

In one preferred implementation, DDWT is configured using 32-bit arithmetic. It should be appreciated that because of the matrix implementation of the intermediate transforms, each component transform of size N requires (N^2) multiplications and (N^2−N) additions. Accordingly, for a given intra prediction mode, if the first stage DDWT consists of intermediate transforms of size N1, . . . , Nk1 and the second stage DDWT consists of intermediate transforms of size M1, . . . , Mk2, then the overall complexity for this particular mode is given by the following.

Number of multiplications: $\Sigma N_i^2 + \Sigma M_i^2$

Number of additions: $\Sigma(N_i^2 - N_i) + \Sigma(M_i^2 - M_i)$

It should be noted that since the transform matrices contain many zero entries, the complexity of DDWT can be reduced. In the current implementation, the following complexity can be derived for DDWT.

4×4 transforms:
  Mode 0 and 1:
    128 multiplications;
    96 additions;
  Mode 2: similar to AVC;
  Mode 3 and 4:
    128 multiplications;
    96 additions;
  Mode 5 to 8:
    122 multiplications; and
    90 additions.
8×8 transforms:
  Mode 0 and 1:
    1024 multiplications;
    896 additions;
  Mode 2: similar to AVC;
  Mode 3 and 4:
    1024 multiplications;
    896 additions;
  Mode 5 to 8:
    956 multiplications; and
    828 additions.

2.5. Memory Requirements.

4×4 transforms:
  Mode 0 and 1:
    Fixed table: 4×4;
    Dynamic table: 4×4;
  Mode 2: similar to AVC;
  Mode 3 and 4:
    Fixed table: 7×7;
    Dynamic table: 7×4;
  Modes 5-8:
    Fixed table: 5×5;
    Dynamic table: 5×4;
8×8 transforms:
  Mode 0 and 1:
    Fixed table: 8×8;
    Dynamic table: 8×8;
  Mode 2: similar to AVC;
  Mode 3 and 4:
    Fixed table: 15×15;
    Dynamic table: 15×8;
  Mode 5-8:
    Fixed table: 11×11;
    Dynamic table: 11×8;

In the decoder, the quantized coefficients are de-quantized by (1). Then the transformed coefficients are inverse transformed by DWT as in the example of FIG. 4C and then by another inverse DWT as in the example in FIG. 4B to obtain the pixels as in the example in FIG. 4A. The pixels are than scaled by two (2) to obtain the reconstructed pixel value.

Figure 8:
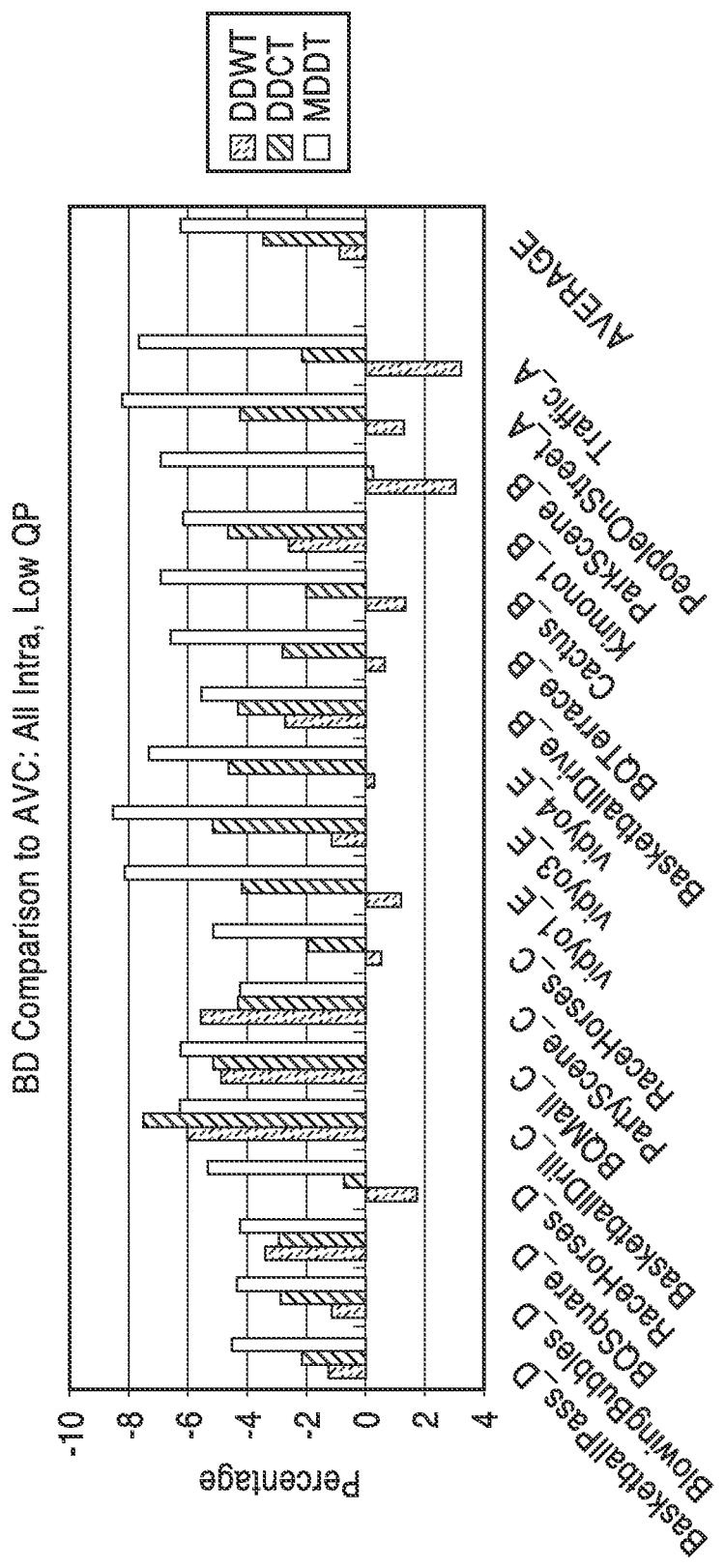
FIG. 8 is a bar graph of average percentage BD-Rate changes of all intra coding using lower QP range for DDWT, DDCT, and MDDT relative to AVC as specified by the measurement method in ITU-T SG16/Q6 Doc. VCEG-A111 (Percentage BD-Rate), according to an element of the present invention with for a number of video sequences.
Figure 9:
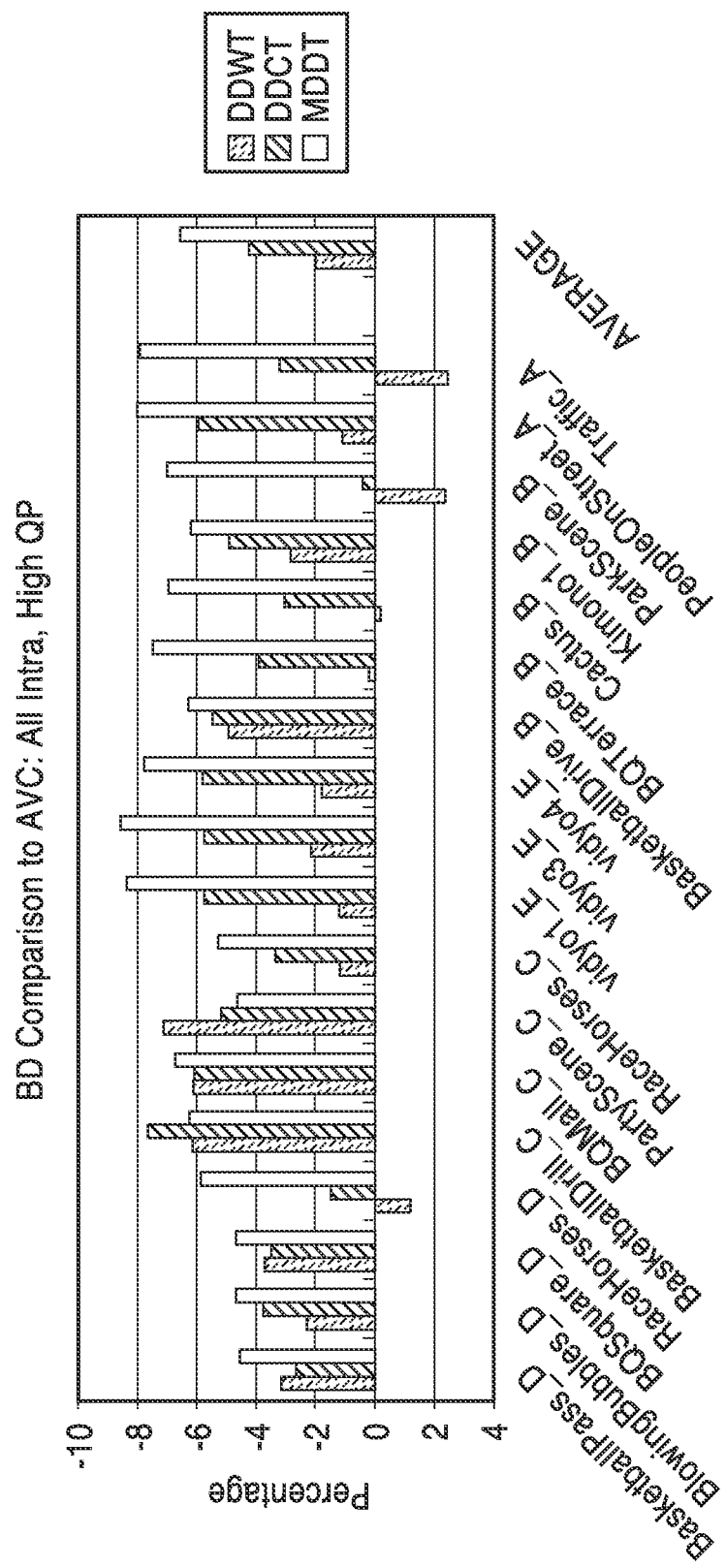
FIG. 9 is a bar graph of percentage of BD-Rate changes for all intra coding using a higher QP range of DDWT, DDCT, and MDDT relative to AVC according to an element of the present invention for a number of video sequences.
Figure 10:
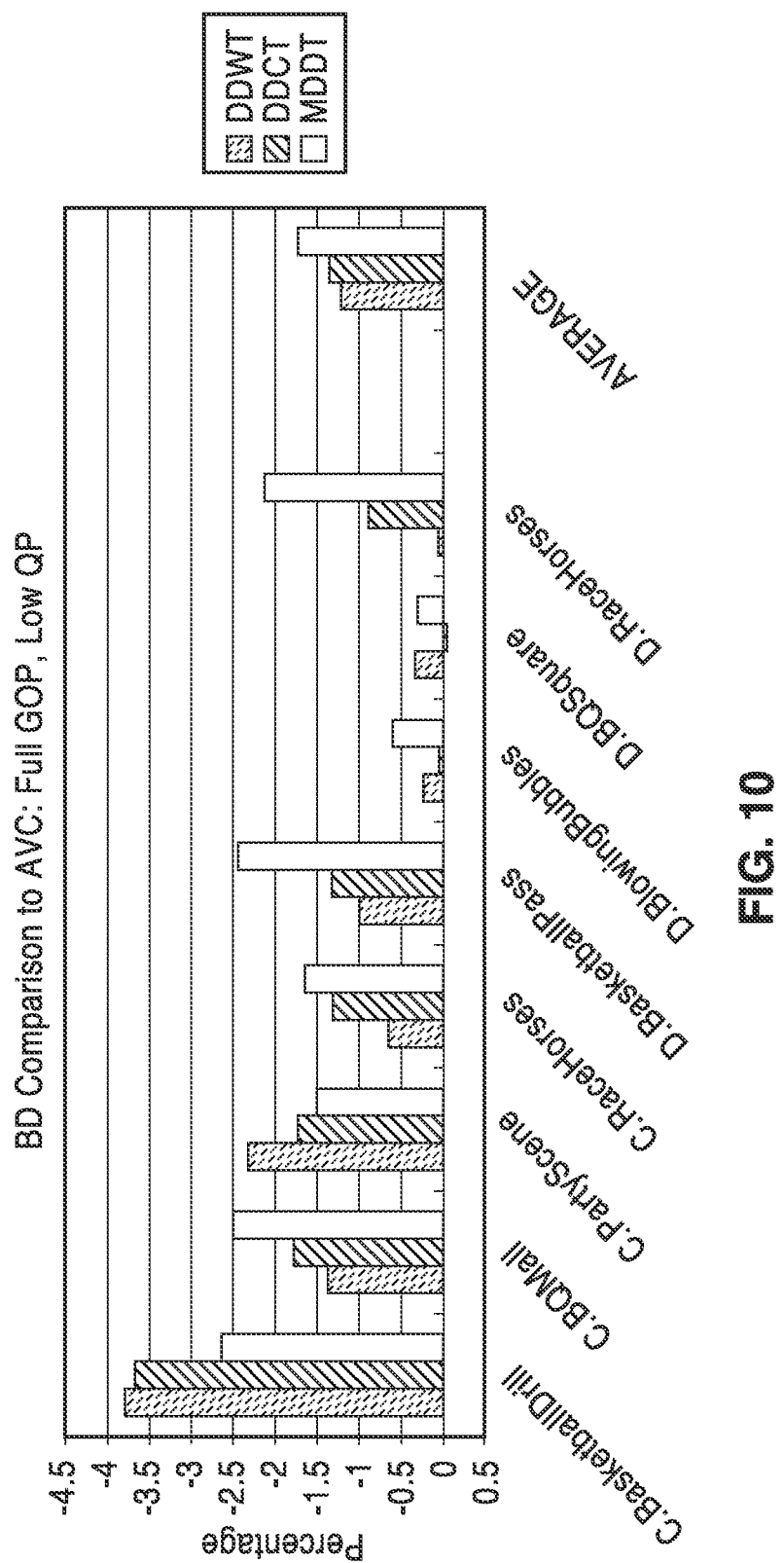
FIG. 10 is a bar graph of percentage BD-Rate changes for encoding full GOP using a lower QP range of DDWT, DDCT, and MDDT relative to AVC according to an element of the present invention for a number of video sequences.
Figure 11:
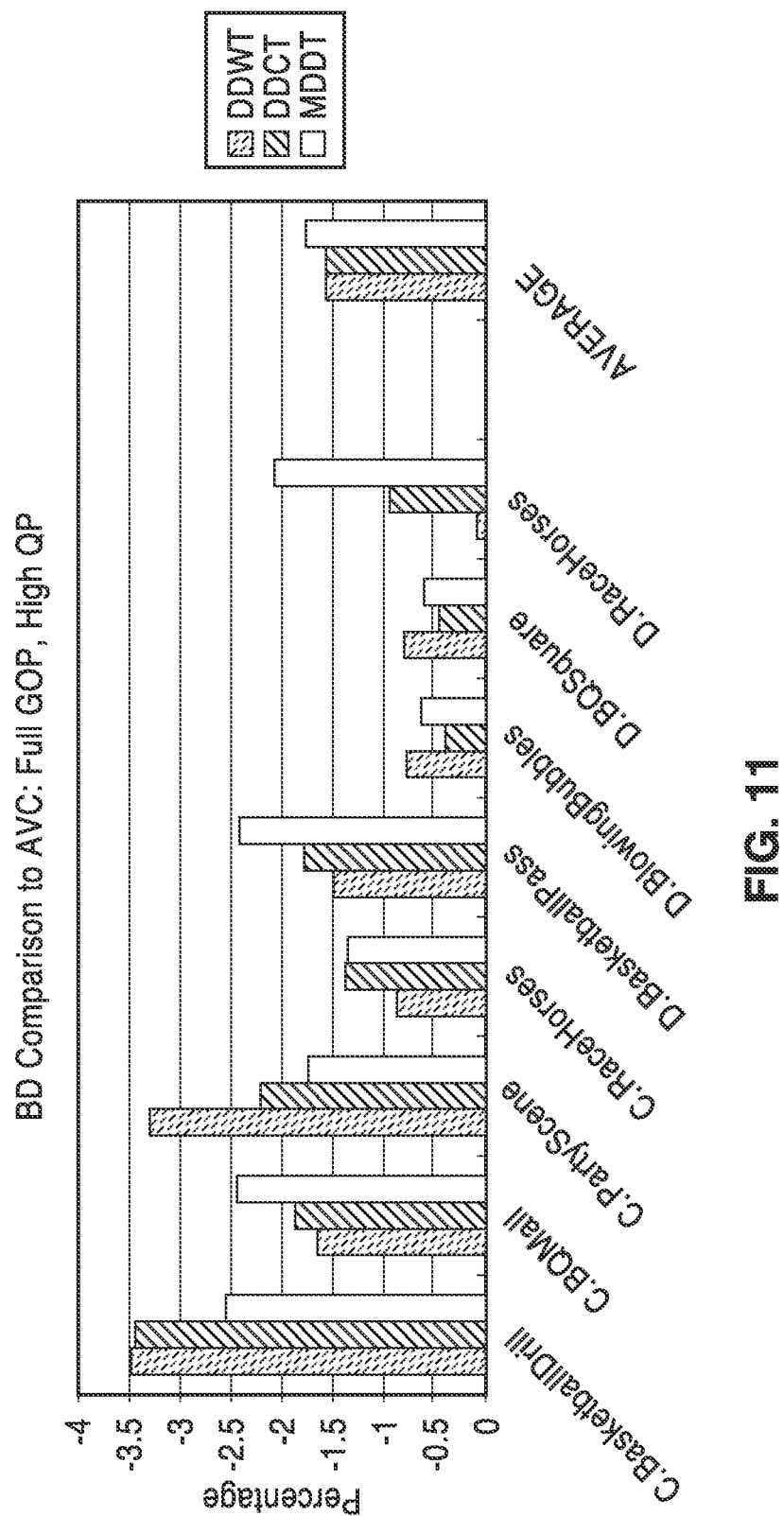
FIG. 11 is a bar graph of percentage BD-Rate changes for encoding full GOP coding using a higher QP range of DDWT, DDCT, and MDDT relative to AVC according to an element of the present invention with DDCT and MDDT for a number of video sequences.

FIG. 8 through FIG. 11 are graphs illustrating the percentage BD-Rate changes of DDWT, DDCT, and MDDT with respect to AVC. FIG. 8 through FIG. 9 depict that when encoding Intra only GOP structure, the DDWT has the least among of average bitrate reductions with respect to AVC among DDWT, DDCT, and MDDT. However, FIG. 10 and FIG. 11 illustrate that when encoding with full GOP structure with I, P, and B pictures, the percentage BD-rate reductions with respect to AVC among the three methods are similar.

Figure 12:
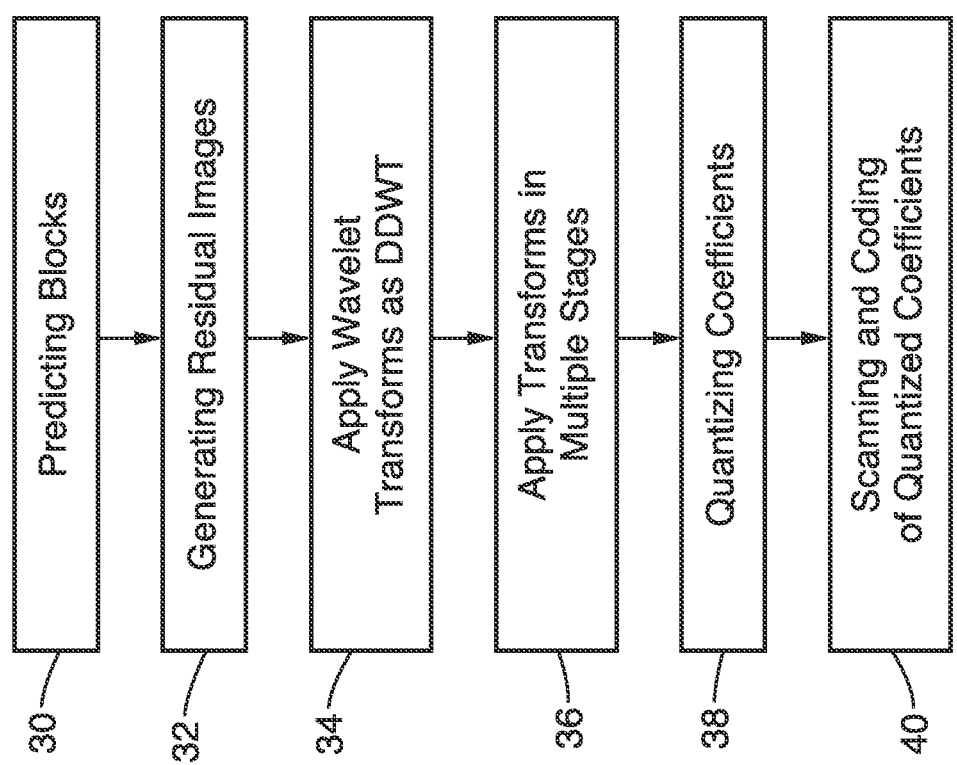
FIG. 12 is a flowchart of video coding using the Directional Discrete Wavelet Transforms (DDWT) according to an aspect of the present invention.

FIG. 12 is a flowchart summarizing principle steps according to the present invention. Blocks are predicted 30 within video frames based on previously-coded spatial or temporal information and residual images generated 32 to which Directional Discrete Wavelet Transforms (DDWT) are applied 34 in response to prediction directions of current blocks to generate blocks of coefficients. DDWT creates a new set of wavelet transforms for coding residual images, and applies the transforms in multiple stages 36 with a first stage along a prediction direction, and at least a second stage across the prediction direction which utilizes a plurality of transforms which may be of different sizes. The blocks of coefficients are quantized 38 into quantized coefficients, and finally the coefficient are scanned 40, such as using a fixed scanning pattern based on the Quantization Parameter (QP) and the prediction direction, into an encoded video output.

It will be appreciated that elements of the present invention are implemented for execution within a video encoding apparatus, such as in response to programming resident in memory which is executable on one or more computer processing elements configured for performing video compression. In addition, it will be appreciated that elements of the present invention can be implemented as programming stored on a media, wherein the media can be accessed for execution by the one or more computer processing element.

The present invention provides methods and apparatus for video encoding using two pass waveform transforms which provide enhanced edge representations in the encoded video. Inventive teachings can be applied in a variety of apparatus and applications, including video encoders, cameras and other video processing apparatus. As can be seen, therefore, the present invention includes the following inventive embodiments among others:

1. An apparatus for inter coding and intra coding of video within a video encoder, comprising: a computer having an associated memory and configured for video encoding; and programming configured for retention on said associated memory and executable on said computer for, predicting blocks within video frames based on previously-coded spatial or temporal information, generating a residual image, applying wavelet transforms as Directional Discrete Wavelet Transforms (DDWT) to said residual images in response to prediction directions of current blocks to generate blocks of coefficients, wherein said DDWT is applied in multiple stages comprising a first stage along a prediction direction, and at least a second stage across the prediction direction, quantizing said blocks of coefficients into quantized coefficients, and scanning and coding of said quantized coefficients into an encoded video output.

2. The apparatus as recited in embodiment 1, wherein said second stage comprises a plurality of transforms which may be of different sizes.

3. The apparatus as recited in embodiment 1, wherein said wavelet transforms comprise Haar wavelet transforms.

4. The apparatus as recited in embodiment 1, wherein said wavelet transforms comprise 5-3 wavelets, or other biorthogonal wavelets, and/or a mixture of wavelet and DCT transforms.

5. The apparatus as recited in embodiment 4, wherein said Haar wavelet transforms comprise 2-tap filters with decimation by two.

6. The apparatus as recited in embodiment 1, wherein said Directional Discrete Wavelet Transforms (DDWT) provides nine (9) transforms for a 4×4 block, nine (9) transforms for a 8×8 block, and four (4) transforms for a 16×16 block.

7. The apparatus as recited in embodiment 1, wherein said wavelet transforms are not applied in fixed horizontal and vertical directions during intra coding which would cross feature edges and negatively impact quality of reconstructed images.

8. The apparatus as recited in embodiment 1, wherein said Directional Discrete Wavelet Transforms (DDWT) create a new set of wavelet transforms for coding of the residual image.

9. The apparatus as recited in embodiment 1, wherein said Directional Discrete Wavelet Transforms (DDWT) utilizes different sizes of transforms for application on different intra and/or inter prediction errors.

10. The apparatus as recited in embodiment 9, wherein said Directional Discrete Wavelet Transforms (DDWT) comprises sizes 4×4, 8×8 and 16×16.

11. The apparatus as recited in embodiment 1, wherein visual appearance of frames nearby image feature edges is increased in response to the fixed encoding of Directional Discrete Wavelet Transforms (DDWT) without the use of training with a training set.

12. The apparatus as recited in embodiment 1, wherein said Directional Discrete Wavelet Transforms (DDWT) provide encoding of video output with a similar Peak Signal-to-Noise Ratio (PSNR) value as obtained with Mode-Dependent Directional Transforms (MDDT), while improving visual appearance of the video output around image feature edges.

13. The apparatus as recited in embodiment 1, wherein the amount of high frequency energy retained in Directional Discrete Wavelet Transforms (DDWT) I-frames when performing DDWT intra coding exceeds that provided in response to Mode-dependent directional transform (MDDT) encoding.

14. The apparatus as recited in embodiment 1, wherein said programming further comprises coding of additional pixels at block boundaries to increase prediction efficiency of subsequent blocks.

15. The apparatus as recited in embodiment 1, wherein said scanning and coding comprises a fixed scanning pattern based on the Quantization Parameter (QP) and the intra prediction mode.

16. The apparatus as recited in embodiment 1, wherein said apparatus incorporates entropy encoding, run-length encoding, and/or tree structures.

17. An apparatus for inter coding and intra coding of video within a video encoder, comprising: a computer having an associated memory and configured for video encoding; and programming configured for retention on said associated memory and executable on said computer for, predicting blocks within video frames based on previously-coded spatial or temporal information, generating residual images, applying wavelet transforms as Directional Discrete Wavelet Transforms (DDWT) to said residual images in response to prediction directions of current blocks to generate blocks of coefficients, wherein said DDWT creates a new set of wavelet transforms for coding residual images, and applies the transforms in multiple stages comprising a first stage along a prediction direction, and at least a second stage across the prediction direction which utilize a plurality of transforms which may be of different sizes, quantizing said blocks of coefficients into quantized coefficients, and scanning and coding of said quantized coefficients using a fixed scanning pattern based on the Quantization Parameter (QP) and the prediction direction into an encoded video output.

18. The apparatus as recited in embodiment 17, wherein said wavelet transform comprises a Haar wavelet transform, 5-3 wavelet transform, other bio-orthogonal wavelets, and/or a mixture of wavelet and DCT transforms.

19. The apparatus as recited in embodiment 17, wherein said DDWT provides nine (9) transforms for a 4×4 block, nine (9) transforms for a 8×8 block, and four (4) transforms for a 16×16 block.

20. A method of coding video within a video encoder, comprising: predicting blocks within video frames based on previously-coded spatial or temporal information; generating a residual image; applying wavelet transforms as Directional Discrete Wavelet Transforms (DDWT) to said residual images in response to prediction directions of current blocks to generate blocks of coefficients; wherein said DDWT is applied in multiple stages comprising a first stage along a prediction direction, and at least a second stage across the prediction direction; quantizing said blocks of coefficients into quantized coefficients; and scanning and coding of said quantized coefficients into an encoded video output.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for inter coding and intra coding of video within a video encoder, comprising:
    (a) computer having an associated memory and configured for video encoding; and
    (b) programming configured for retention on said associated memory and executable on said computer for,
        (i) predicting blocks within video frames based on previously-coded spatial or temporal information,
        (ii) generating a residual image,
        (iii) applying wavelet transforms as Directional Discrete Wavelet Transforms (DDWT) to said residual images in response to prediction directions of current blocks to generate blocks of coefficients,
        (iv) wherein said DDWT is applied in multiple stages comprising a first stage DDWT and a second stage DDWT by:
            applying said first stage DDWT as a one dimensional DWT along a prediction direction,
            arranging transformed coefficients from said first stage DDWT into multiple groups having similar frequency attributes and a group of remaining transform coefficients, and
            applying said second stage DDWT as a one dimensional DWT across the prediction direction with a different one dimensional DWT applied to each group of said multiple groups,
        (v) quantizing said blocks of coefficients into quantized coefficients, and
        (vi) scanning and coding of said quantized coefficients into an encoded video output.

2. The apparatus as recited in claim 1, wherein said second stage comprises a plurality of transforms which may be of different sizes.

3. The apparatus as recited in claim 1, wherein said wavelet transforms comprise Haar wavelet transforms.

4. The apparatus as recited in claim 1, wherein said wavelet transforms comprise Harr wavelet transforms, 5-3 wavelet transforms, or other biorthogonal wavelets, or a mixture of wavelet and DCT transforms, or a combination selected from 5-3 wavelets, biorthogonal wavelets, and mixture of wavelet transforms and DCT transforms.

5. The apparatus as recited in claim 4, wherein said Haar wavelet transforms comprise 2-tap filters with decimation by two.

6. The apparatus as recited in claim 1, wherein said Directional Discrete Wavelet Transforms (DDWT) provides nine (9) transforms for a 4×4 block, nine (9) transforms for a 8×8 block, and four (4) transforms for a 16×16 block.

7. The apparatus as recited in claim 1, wherein said wavelet transforms are not applied in fixed horizontal and vertical directions during intra coding which would cross feature edges.

8. The apparatus as recited in claim 1, wherein said Directional Discrete Wavelet Transforms (DDWT) create a new set of wavelet transforms for coding of the residual image.

9. The apparatus as recited in claim 1, wherein said Directional Discrete Wavelet Transforms (DDWT) utilizes different sizes of transforms for application on different intra prediction errors, or different inter prediction errors, or a combination of different intra prediction errors and different inter prediction errors.

10. The apparatus as recited in claim 9, wherein said Directional Discrete Wavelet Transforms (DDWT) comprises sizes 4×4, 8×8 and 16×16.

11. The apparatus as recited in claim 1, wherein fixed encoding of Directional Discrete Wavelet Transforms (DDWT) is utilized without training with a training set.

12. The apparatus as recited in claim 1, wherein said Directional Discrete Wavelet Transforms (DDWT) provide encoding of video output with a similar Peak Signal-to-Noise Ratio (PSNR) value as obtained with Mode-Dependent Directional Transforms (MDDT).

13. The apparatus as recited in claim 1, wherein an amount of high frequency energy retained in Directional Discrete Wavelet Transforms (DDWT) I-frames when performing DDWT intra coding exceeds that provided in response to Mode-dependent directional transform (MDDT) encoding.

14. The apparatus as recited in claim 1, wherein said programming further comprises coding of additional pixels at block boundaries to increase prediction efficiency of subsequent blocks.

15. The apparatus as recited in claim 1, wherein said scanning and coding comprises a fixed scanning pattern based on the Quantization Parameter (QP) and the intra prediction mode.

16. The apparatus as recited in claim 1, wherein said apparatus incorporates entropy encoding, or run-length encoding, or tree structures, or a combination of entropy encoding and run-length encoding, or a combination of entropy encoding and tree structures, or a combination of run-length encoding and tree structures, or a combination of entropy encoding, run-length encoding, and tree structures.

17. An apparatus for inter coding and intra coding of video within a video encoder, comprising:
  (a) a computer having an associated memory and configured for video encoding; and
  (b) programming configured for retention on said associated memory and executable on said computer for,
    (i) predicting blocks within video frames based on previously-coded spatial or temporal information,
    (ii) generating residual images,
    (iii) applying wavelet transforms as Directional Discrete Wavelet Transforms (DDWT) to said residual images in response to prediction directions of current blocks to generate blocks of coefficients,
    (vi) wherein said DDWT creates a new set of wavelet transforms for coding residual images, and applies the transforms in multiple stages comprising a first stage DDWT and a second stage DDWT by:
      applying said first stage DDWT as a one dimensional DWT along a prediction direction,
      arranging transformed coefficients from said first stage DDWT into multiple groups having similar frequency attributes and a group of remaining transform coefficients, and
      applying said second stage DDWT as a one dimensional DWT across the prediction direction which utilize a plurality of transforms which may be of different sizes applied to each group of said multiple groups,
    (v) quantizing said blocks of coefficients into quantized coefficients, and
    (vi) scanning and coding of said quantized coefficients using a fixed scanning pattern based on the Quantization Parameter (QP) and the prediction direction into an encoded video output.

18. The apparatus as recited in claim 17, wherein said wavelet transform comprises a Haar wavelet transform, or a 5-3 wavelet transform, or other biorthogonal wavelets, or a mixture of wavelet and DCT transforms, or a combination selected from the group consisting of Haar wavelet transforms, 5-3 wavelet transforms, other biorthogonal wavelets, and a mixture of wavelet and DCT transforms.

19. The apparatus as recited in claim 17, wherein said DDWT provides nine (9) transforms for a 4×4 block, nine (9) transforms for a 8×8 block, and four (4) transforms for a 16×16 block.

20. A method of coding video within a video encoder, comprising:
  (a) predicting blocks within video frames based on previously-coded spatial or temporal information;
  (b) generating a residual image;
  (c) applying wavelet transforms as Directional Discrete Wavelet Transforms (DDWT) to said residual images in response to prediction directions of current blocks to generate blocks of coefficients;
  (d) wherein said DDWT is applied in multiple stages comprising a first stage DDWT and a second stage DDWT by:
    (i) applying said first stage DDWT as a one dimensional DWT along a prediction direction,
    (ii) arranging transformed coefficients from said first stage DDWT into multiple groups having similar frequency attributes and a group of remaining transform coefficients, and
    (iii) applying said second stage DDWT as a one dimensional DWT across the prediction direction with a different one dimensional DWT applied to each group of said multiple groups;
  (e) quantizing said blocks of coefficients into quantized coefficients; and
  (f) scanning and coding of said quantized coefficients into an encoded video output.

* * * * *